Feb. 26, 1935.  M. W. McCONKEY  1,992,227

BRAKE

Original Filed Feb. 11, 1929

INVENTOR.
MONTGOMERY W. McCONKEY
BY O. H. Fowler
ATTORNEY

Patented Feb. 26, 1935

1,992,227

UNITED STATES PATENT OFFICE 1,992,227

BRAKE

Montgomery W. McConkey, South Bend, Ind., assignor to Bendix Brake Company, South Bend, Ind., a corporation of Illinois Original application February 11, 1929, Serial No. 339,000. Divided and this application March 7, 1931, Serial No. 520,801

10 Claims. (Cl. 188—79.5)

This invention relates to brakes, and more particularly to internal expanding brakes.

The present invention is a division of my pending application Serial No. 339,000, filed February 11, 1929, and is made under the requirements of the United States Patent Office under provision of rule 42.

The invention broadly comprehends an adjusting device for the friction element of an internal expanding brake.

An important object of the invention is to provide a floating connection between the articulated ends of friction elements adapted to adjust these elements in proper relation with respect to the braking surface of the drum.

Another object of the invention is to provide a floating adjusting connection for the friction element of a brake arranged to adjust the length of that element to take up for wear of the friction lining carried thereby.

Other objects of the invention will appear from the following description taken in connection with the drawing, which forms a part of this specification, and in which.

Figure 1:
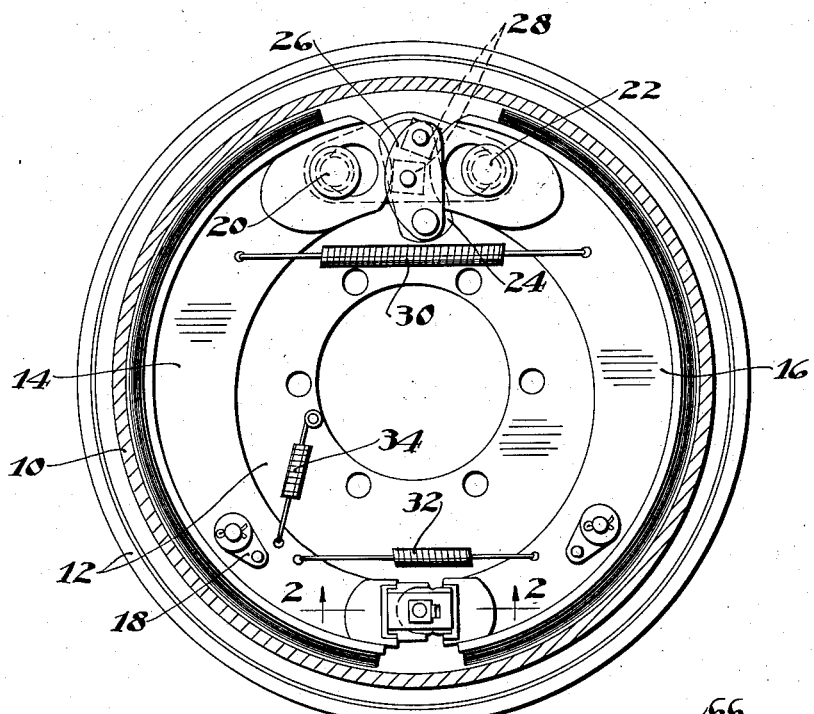
Figure 1 is a vertical sectional view of a brake taken just back of the head of the drum showing the friction elements or shoes in side elevation and illustrating the invention as applied.

The brake selected for illustration includes a rotatable drum 10 which may be secured to a wheel. At the open side of the drum is positioned a suitable support such as a backing plate 12 and positioned on the backing plate is the friction means of the brake.

As shown, the friction means includes a pair of pivotally and adjustably connected shoes 14 and 16. The shoes are retained against lateral movement by suitable shoe-positioning means 18 and are arranged so that when the drum is turning clockwise, the shoe 14 anchors on a fixed anchor 20, and when the drum is turning counterclockwise, the shoe 16 anchors on a fixed anchor 22.

The brake-applying means includes a rock shaft positioned on the backing plate between the separable ends of the shoes 14 and 16 and an arm 24 carried by the rock shaft supporting a cam 26, having thereon blocks 28 arranged to engage the respective separable ends of the friction element or shoes so that the shoes may be spread apart to engage the braking surface of the drum.

The shoes 14 and 16 are connected by suitable return springs 30 and 32 and connecting the shoe 14 to the fixed support or backing plate 12 is an auxiliary return spring 34. These springs serve to return the shoes when the applied force is released to the off position and to retain them when in this position in proper spaced relation to the braking surface of the drum.

Positioned on the articulated ends of the shoes are suitable brackets 36 and 38 between which is positioned a wedge comprising two parts 40 and 42. As shown, the part 40 has a semi-cylindrical groove 44 and the part 42 a semi-cylindrical portion 46 positioned in the groove 44, so that a pivotal connection between the parts 40 and 42 may be provided. Part 42 of the wedge is bored to receive a bolt 48 and a suitable washer 50 is positioned on the bolt between its head and the wedge. This washer is preferably spot-welded to one of the parts of the wedge and is provided with a lip 52 engaging the head of the bolt to prevent rotation thereof.

The bolt 48 has threaded thereon a nut 54 and positioned on the bolt between the nut 54 and the brackets 36 and 38 is a suitable spacer 56. As shown, the spacer extends through a suitable opening 58 in the backing plate, so that the nut 54 may be accessible from outside of the brake structure.

By tightening on the nut 54, the wedge may be moved transversely with respect to the shoes to wedge the shoes apart, so that the shoes may be adjusted to take up for wear and to position them in proper spaced relation to the braking surface of the drum.

Figure 4:
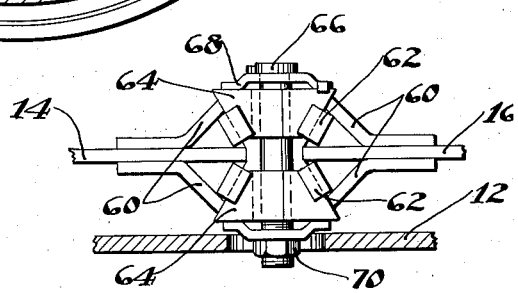
Figure 4 illustrates a modification of the invention.
Figure 2:
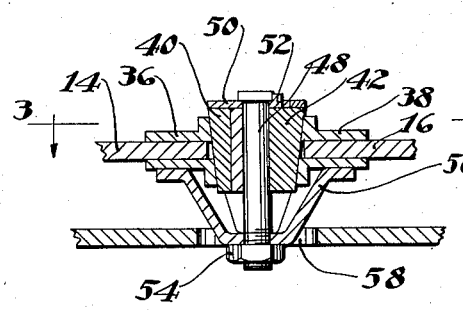
Figure 2 is a sectional view substantially on line 2—2 of Figure 1.
Figure 3:
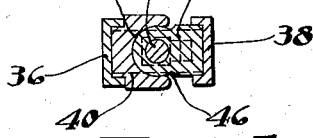
Figure 3 is a section taken substantially on line 3—3 of Figure 2.

A modification of the invention is illustrated in Figure 4 wherein the articulated ends of the shoes 14 and 16 are provided with brackets 60. As shown, these brackets comprise stampings having oppositely arranged guideways 62 in which are positioned oppositely arranged wedging members 64 having registering bores for the reception of a bolt 66. The wedges 64 are formed in two parts pivoted together to provide a pivotal connection between the shoes 14 and 16, and the bolt 66 is retained against rotation by a suitable washer 68 and a nut 70 threaded on the bolt accessible through an opening in the backing plate 12.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. An adjusting device comprising connected members pivotally engaging each other and having their respective outer surfaces inclined to form a two-part wedge arranged in wedging relation between two movable members.

2. An adjusting device comprising movable members arranged end to end and connected members pivotally engaging each other and independently movable about a central transverse axis and jointly movable transversely between the ends.

3. A brake comprising shoes arranged end to end, inclined surfaces on the adjacent ends, and connected members pivotally engaging each other and respectively engaging said inclined surfaces and together movable transversely between the inclined surfaces.

4. A brake comprising shoes arranged end to end, guides on the respective ends of the shoes, a wedge member having interengaging parts positioned in the guides, said parts being in pivotal engagement with each other, and means for moving the wedge member transversely of the shoes.

5. A brake comprising shoes arranged end to end, brackets on the adjacent ends of the shoes, inclined faces on the brackets, wedging members pivotally engaging each other and supported on the brackets and means for moving the wedging members transversely with respect to the shoes.

6. A brake comprising shoes arranged end to end, brackets on the adjacent ends of the shoes, inclined faces on the brackets, and wedging members pivotally engaging each other and movable on the inclined faces transversely with respect to the shoes.

7. An adjustment for brakes or the like comprising a pair of shoes, a pair of members pivotally connected to each other, one having a cylindrical transverse socket pivotally embracing an externally-cylindrical portion on the other, the members having converging inclined outer surfaces wedgingly engaging the ends of the shoes.

8. A brake comprising shoes arranged end to end, a wedge between the shoe ends adapted to be moved bodily and parallel to the axis of the brake to wedge the shoes apart, a thrust member bridging the shoe ends and engaging the sides of the shoe adjacent their ends, and means engaging the wedge and thrust member and operable to draw the wedge toward the member, said thrust members, wedge and shoe ends being free to float with respect to said brake.

9. A brake comprising shoes arranged end to end, a wedge between the shoe ends movable bodily and parallel to the axis of the brake between the shoes to wedge them apart, a thrust member bridging the shoe ends and engaging the sides of the shoes adjacent their ends, and a transversely extending bolt engaging the wedge and thrust member and operable to draw the wedge toward the member, said thrust members, wedge and shoe ends being free to float with respect to said brake.

10. An adjusting device comprising pivotally interengaging members having inclined surfaces on their opposite faces, respectively and arranged in wedging relation between two movable members.

MONTGOMERY W. McCONKEY.